J. Miller.
Grain Drill.
N°50,213.  Patented Sep. 26, 1865.
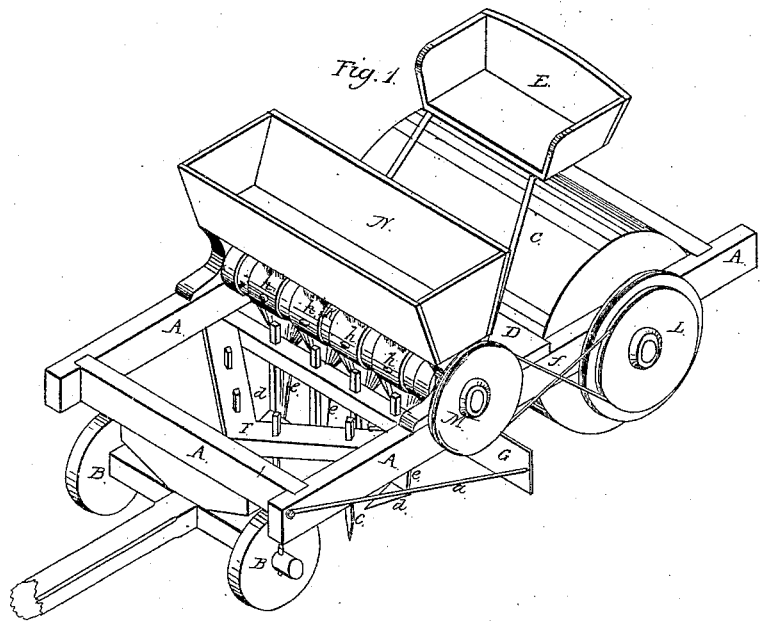
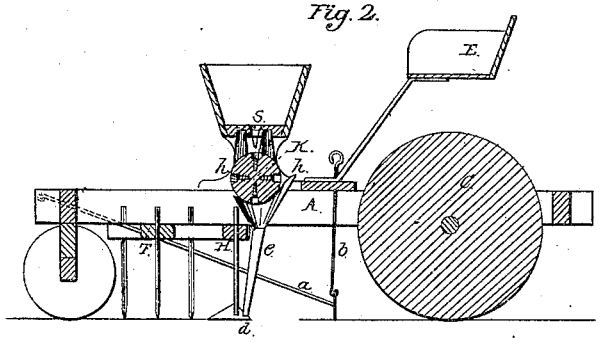
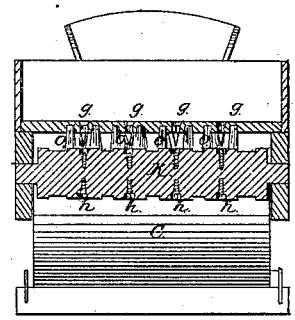
Witnesses:
Inventor:

UNITED STATES PATENT OFFICE.

JOHN MILLER, OF RUSSELLVILLE, KENTUCKY.

IMPROVEMENT IN SEED-PLANTERS.

Specification forming part of Letters Patent No. 50,213, dated September 26, 1865.

*To all whom it may concern:*

Be it known that I, JOHN MILLER, of Russellville, in the county of Logan and State of Kentucky, have invented a new and useful Improvement in Seed-Planters; and I do hereby declare that the following is a full, clear, and exact description of the construction and operation of the same, reference being had to the accompanying drawings, making a part of this specification, in which—

Figure 1 is a view in perspective of a seed-planter to which my improvement is attached. Fig. 2 is a longitudinal vertical section through one of the openings in the seed-box; and Fig. 3 is a longitudinal central section through the feed-box, retaining-bristles, and feed-roller.

It is the object of my invention to sow seed broadcast or in drills, to harrow the ground before sowing, and cover the seed and roll the sown surface smooth by once passing the machine over the ground; and to this end my invention consists in surrounding the openings from the feed-box with bristles and cutting them in a concave arc to correspond with the arc of the circumference of the feed-roller, so as to retain the seed securely on the roller until they are to be dropped, and to regulate the quantity delivered; and also to so arrange the feed-roller as that when turning forward it shall sow broadcast and when turning backward it shall deliver the seed through tubes in drills; and, besides, in the combination of a harrow, opening-hoes, drill-tubes, a coverer, and roller, so that the machine shall remove the stubble, scarify the ground, form the drill, deliver and cover the seed, and roll the ground smooth at one operation.

A suitable frame, A, is mounted on truck-wheels B in front and supported on a roller, C, in the rear, and the frame is strengthened by a cross-piece, D, that serves to support a driver's seat, E, over the roller C.

Attached to the frame on its under side, and between the truck-wheels and the opening-hoes, a harrow, F, is placed, the teeth $c c$ of which project a short distance below the plane on which the truck-wheels and supporting-roller move, that they may loosen the ground in front of the hoes and remove stubble or trash that might else obstruct the planting of the seed with regularity.

To the front of the outside timbers of the frame rods $a$ and $a'$ are pivoted by screws or bolts, and these rods support a covering block or bar, G, at their rear end, between the seed-tubes and supporting-roller. A rod, $b$, is attached to the center of this covering-plate at its upper edge and passes through the piece D to within the reach of the driver, who can thus at pleasure raise the covering-plate to pass obstructions or when the planting may not require it; but when there are no obstructions before it, and it is desired to cover the seed before the ground is rolled, the driver, by depressing the rod, can bring the covering-plate into operation. In the drawings this rod is shown as a wire; but it is obvious that it may be a toothed bar passing over a spring-catch to hold the covering-plate at any elevation desired.

A bar, H, on the under side of the frame supports the opening-hoes $d d d d$, and it is obvious that these may be in the form of bull-tongues or mold-board plows, if preferred. The bar H also carries guiding-tubes $e e e e$, one directly behind each hoe or plow, that are formed large at their upper end and cover the rear portion of the feed-roller K, while they taper to the ground and deliver the seed in the furrow made by the hoe.

The feed-roller K is supported in suitable bearings in the frame, and rotates directly over the seed-tubes. It is rotated by a band, $f$, driven by a pulley, L, on the covering-roller, the band passing around a pulley, M, on the feed-roller K. It is obvious that these pulleys may have change-grooves to vary the relative speeds of the covering and feed-rollers to adapt the machine to a variety of planting; or cog-wheels may be substituted for the belt.

On the frame and directly over the feed-roller K, I place the seed-box N, having perforations $g g g g$ placed centrally over the middle of the seed-tubes $e e e e$. These openings are surrounded with a series of tufts or bristles, O, that form a close circle, and the lower ends of the bristles are cut in a concave arch to exactly match the perimeter of the feed-roller. This roller has depressions $h$ at determined intervals around it, to receive the seed through the openings or perforations $g$ in the feed-trough, and these depressions may have screws to vary the quantity of seed they can contain, for it is manifest that when the screws sunk are deeply the openings will be enlarged and contain more seed, and when the screws are raised the openings will be smaller and contain less seed, of course.

Now, when the seed—wheat, for example—is placed in the trough and the planter put in motion, with the pulley-band crossed, the seed will pass through the perforations in the bottom of the box to the surface of the feed-roller, where it will be retained by the bristles until one of the depressions of the rollers secures its supply, when the continuous rotation of the feed-roller will pass the quantity each depression carries backward into the feeding-tubes, whence it will pass to the ground into the furrow and be covered by the blade and rolled smoothly by the covering-roller.

When it is desired to sow broadcast the driving-band $f$ must be uncrossed, and this will reverse the rotation of the feed-roller, and the seed will be thrown from it as they pass from under the bristles without entering the tubes, and be covered and rolled as if sown broadcast.

When it is desired to adjust the delivery of the seed more or less rapidly or in greater or less quantity, it is only necessary to let the bristles press heavier or lighter upon the feed-roller, and this may be effected merely by placing the feed-trough nearer to or farther from the feed-roller.

It is obvious that the frame of the machine may be attached to the truck-frame by a hand-lever connection, and thus the front of the frame can be elevated or depressed to suit the varying condition of the ground. It is also manifest that the use of fine wire or splints of cane, bamboo, or whalebone as substitutes for the bristles I employ around the feed-roller would be but the equivalent of this feature of my invention.

What I claim as my invention, and desire to secure by Letters Patent, is—

1. Surrounding the openings in the grain-trough with bristles, arranged and operating substantially in the manner set forth.

2. The combination of the feed-roller with the feed-tubes and bristled opening, for the purpose of sowing broadcast or in drills, substantially as described.

3. The combination of the harrow, plows, seed-tubes, covering-bar, and smoothing-roller with the feed-roller and bristled seed-trough, arranged and operating substantially in the manner and for the purpose described.

In testimony whereof I have hereunto subscribed my name.

JOHN MILLER.

Witnesses:
FR. SCHNEIDER,
JOS. I. PEYTON.